US012692173B2

(12) United States Patent
Frischhut et al.

(10) Patent No.:  US 12,692,173 B2
(45) Date of Patent:        Jul. 28, 2026

(54) METHOD FOR MAKING PRECURSORS OF CATHODE ACTIVE MATERIALS FOR LITHIUM ION BATTERIES

(71) Applicant: BASF SE, Ludwigshafen am Rhein (DE)

(72) Inventors: Sabine Frischhut, Ludwigshafen (DE); Thorsten Beierling, Ludwigshafen (DE); Lukas Karl Metzger, Ludwigshafen (DE); Matthias Rauls, Homburg (DE); Marc Duchardt, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 275 days.

(21) Appl. No.: 18/683,954

(22) PCT Filed: Sep. 12, 2022

(86) PCT No.: PCT/EP2022/075233

§ 371 (c)(1),
(2) Date: Feb. 15, 2024

(87) PCT Pub. No.: WO2023/046508

PCT Pub. Date: Mar. 30, 2023

(65) Prior Publication Data

US 2024/0351912 A1        Oct. 24, 2024

(30) Foreign Application Priority Data

Sep. 21, 2021    (EP) ..................................... 21198053

(51) Int. Cl.
| | |
|---|---|
| *C01G 53/42* | (2025.01) |
| *C01G 53/04* | (2025.01) |
| *C01G 53/40* | (2025.01) |
| *H01M 4/02* | (2006.01) |
| *H01M 4/525* | (2010.01) |

(52) U.S. Cl.
CPC ............. *C01G 53/42* (2013.01); *C01G 53/04* (2013.01); *C01G 53/40* (2013.01); *H01M 4/525* (2013.01); *C01P 2002/52* (2013.01); *C01P 2006/40* (2013.01); *H01M 2004/028* (2013.01)

(58) Field of Classification Search
CPC ........ C01G 53/04; C01G 53/40; C01G 53/50; H01M 4/505; H01M 4/525

USPC ....................................................... 252/182.1
See application file for complete search history.

(56) References Cited

U.S. PATENT DOCUMENTS

| | | | | |
|---|---|---|---|---|
| 5,545,392 A | * | 8/1996 | Babjak ................... | C01G 53/04 |
| | | | | 429/105 |
| 2019/0044139 A1 | * | 2/2019 | Sakai ..................... | H01M 4/505 |

FOREIGN PATENT DOCUMENTS

| | | | | | |
|---|---|---|---|---|---|
| CN | 109860581 A | * | 6/2019 | ............ | H01M 4/523 |
| EP | 3023391 A1 | | 5/2016 | | |
| WO | WO-2019168385 A1 | * | 9/2019 | ............ | C01G 53/00 |
| WO | 2019191837 A1 | | 10/2019 | | |
| WO | 2021083686 A1 | | 5/2021 | | |
| WO | WO-2022161087 A1 | * | 8/2022 | ............ | C01G 53/10 |
| WO | 2023285464 A1 | | 1/2023 | | |

OTHER PUBLICATIONS

Translation of CN-109860581-A (Year: 2026).*
Translation of WO-2019168385-A1 (Year: 2026).*
Translation of WO2022161087A1 (Year: 2026).*
Keshavarz et al., "Impact of Mother Liquor Recycle on the Impurity Buildup in Crystallization Processes", Org. Process Res. Dev., vol. 22, pp. 1541-1547 (2018).
International Search Report and Written Opinion for corresponding PCT/EP22/75233 mailed Jan. 9, 2023, 8 pages.

* cited by examiner

*Primary Examiner* — Tri V Nguyen
(74) *Attorney, Agent, or Firm* — Armstrong Teasdale LLP

(57)        ABSTRACT

Disclosed herein is a process for making a particulate (oxy)hydroxide of TM, where TM represents metals and includes nickel and at least one metal selected from cobalt and aluminum and manganese. The process includes the steps of:

(a) combining an aqueous slurry of metallic nickel and at least one metal selected from cobalt and manganese and aluminum with an oxidant selected from nitrate and peroxide in a reaction vessel under an atmosphere with less than 100 ppm $O_2$, thereby obtaining an aqueous reaction medium with a pH value in the range of from 7.5 to 12 containing particles, (b) removing the particles from step (a) from the liquid by a solid-liquid separation method, and drying the particles, and (c) returning mother liquor obtained in step (b) to the reaction vessel.

12 Claims, No Drawings

METHOD FOR MAKING PRECURSORS OF CATHODE ACTIVE MATERIALS FOR LITHIUM ION BATTERIES

CROSS-REFERENCE TO RELATED APPLICATIONS

This application is a U.S. National Phase Application of International Patent Application No. PCT/EP22/75233, filed Sep. 12, 2022, which claims priority to European Patent Application Ser. No. 21/198,053.7, filed Sep. 21, 2021, each of which is hereby incorporated by reference herein.

The present invention is directed towards a process for making a particulate (oxy)hydroxide or oxide of TM wherein TM represents one or more metals, and wherein TM comprises nickel or cobalt and, optionally, at least one metal selected from aluminum and manganese, wherein said process comprises the steps of:

(a) combining an aqueous slurry of metallic nickel or cobalt and, optionally, at least one metal selected from manganese and aluminum with an oxidant selected from nitrate and peroxide in a reaction vessel under an atmosphere with less than 100 ppm $O_2$, thereby obtaining an aqueous reaction medium with a pH value in the range of from 7.5 to 12 containing particles,
  (b) removing the particles from step (a) from the liquid by a solid-liquid separation method, and drying the particles, and
  (c) returning mother liquor obtained in step (b) to the reaction vessel.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides.

The cathode material is of crucial importance for the properties of a lithium ion battery. Lithium-containing mixed transition metal oxides have gained particular significance, for example spinels and mixed oxides of layered structure, especially lithium-containing mixed oxides of nickel, manganese and cobalt; see, for example, EP 1 189 296. Such lithium-containing mixed oxides of nickel, manganese and cobalt are generally prepared in a two-stage process. In a first stage, a sparingly soluble salt of the transition metal(s) is prepared by precipitating it from a solution, for example a carbonate or a hydroxide. This sparingly soluble compound is in many cases also referred to as a precursor. In a second stage, the precursor is mixed with a lithium compound, for example $Li_2CO_3$, LiOH or $Li_2O$, and calcined at high temperatures, for example at 600 to 1100° C.

In the precursor manufacturing process, when performed by (co-)precipitation, usually the sulfates of transition metals such as nickel, cobalt and manganese are used as starting materials. However, this leads to the formation of stoichiometric amounts of alkali metal sulfate. The stoichiometric amounts of sulfate are undesired by-products that need to be disposed of.

In WO 2019/191837, a process is disclosed wherein cathode active materials are made from precursors that are made by oxidation of metals and simultaneous precipitation.

The process, however, leads to disadvantages when manganese is present because under the prevailing alkaline conditions, manganese may be precipitated as $MnO_2$ that is not incorporated well into the precursor. In addition, the magnetic separation as suggested for the removal of unreacted metals does not work for many materials such as, but not limited to aluminum and manganese.

It was therefore an objective of the present invention to provide a process for precursor manufacture that avoids the formation of stoichiometric amounts of alkali metal sulfate and that further reduces the formation of residues of unreacted metals that cannot be removed magnetically. In particular, it was the objective to provide a process that allows manganese as a constituent.

Inventive process or process according to the (present) invention. The inventive process may be carried out as a batch process or as a continuous or semi-batch process.

The inventive process comprises steps (a) to (c), hereinafter also referred to as (a), (b), or (c), respectively. Steps (a) to (c) shall be described in more detail below.

The inventive process is suitable for making particulate (oxy)hydroxides and oxides of TM wherein TM represents metals, and wherein TM comprises nickel and at least one metal selected from cobalt and aluminum and manganese. Preferably, TM comprises at least 50 mol-% nickel. More preferably, TM comprises at least 50 mol-% nickel and at least one of manganese and aluminum.

In one embodiment of the present invention, particulate (oxy)hydroxide and oxides of TM are selected from hydroxides and oxyhydroxides and oxides of TM wherein TM is a combination of metals according to general formula (I)

$$(Ni_aCo_bMn_c)_{1-d}M_d \qquad (I)$$

with
a being in the range of from 0.6 to 0.95, preferably 0.80 to 0.94,
b being in the range of from zero to 0.2, preferably 0.01 to 0.12,
c being in the range of from zero to 0.2, preferably 0.02 to 0.10,
d being in the range of from zero to 0.1,
M is selected from Mg, Al, Ti, Zr, Mo, W, Al, Mg, Nb, and Ta, and combinations of at least two of the foregoing, preferably, M is selected from Mg and Al.

$$a + b + c = 1, \text{ and } c + d > \text{zero.}$$

For example, the variables in formula (I) may be defined as follows:
a is in the range of from 0.6 to 0.95, preferably 0.80 to 0.94,
b is in the range of from 0.025 to 0.2, preferably 0.01 to 0.12,
c is in the range of from zero to 0.2, and
d is in the range of from zero to 0.1, preferably 0.02 to 0.10,
M is selected from Mg, Al, Ti, Zr, Mo, W, Al, Mg, Nb, and Ta, $$a + b + c = 1, \text{ and } b + c > \text{zero.}$$

In another embodiment, TM corresponds to formula (I a)

$$(Ni_aMn_c)_{1-d}M_d \quad \text{(I a)}$$

wherein a is in the range of from 0.6 to 0.95, preferably 0.80 to 0.94, c is in the range of from bigger than zero to 0.2, and d is in the range of from zero to 0.1, M is selected from Mg, Al, Ti, Zr, Mo, W, Al, Mg, Nb, and Ta, $$a + c = 1, \text{ and } c > \text{zero}.$$

Said particulate (oxy)hydroxide or oxide of TM may contain traces of further metal ions, for example traces of ubiquitous metals such as sodium, calcium, iron or zinc, as impurities but such traces will not be taken into account in the description of the present invention. Traces in this context will mean amounts of 0.05 mol-% or less, referring to the total metal content of TM.

Particulate (oxy)hydroxide or oxide of TM is in particulate form. In one embodiment of the present invention, the mean particle diameter (D50) of particulate (oxy)hydroxide or oxide of TM is in the range of from 2 to 20 μm, preferably 3 to 16 μm, more preferably 7 to 14 μm. The mean particle diameter (D50) in the context of the present invention refers to the median of the volume-based particle diameter, as can be determined, for example, by light scattering. In one embodiment, the particulate (oxy)hydroxides and oxides of TM have a monomodal particle diameter distribution. In other embodiments, the particle distribution of the particulate (oxy)hydroxides and oxides of TM may be bimodal, for example with one maximum in the range of from 1 to 5 μm and a further maximum in the range of from 7 to 16 μm. Monomodal is preferred.

In another embodiment of the present invention the mean particle diameter (D50) of particulate (oxy)hydroxide or oxide of TM is in the range of from 1 to 7 μm, preferably 2 to 6 μm, more preferably 3 to 5 μm.

The particle shape of the secondary particles of said particulate (oxy)hydroxides and oxides of TM is preferably spheroidal, that are particles that have a spherical shape. Spheroidal shall include not just those which are exactly spherical but also those particles with a form factor in the range of from 0.7 to 1 and an axis ratio of the bounding box in the range of from 1.00 to 1.25. To determine the axis ratio of the bounding box of a specific particle, the smallest possible rectangular bounding box is set around the top view SEM image of a particle. The axis ratio is calculated from the length of the two sides $a_1$ and $a_2$ (with $a_1 \geq a_2$) by: axis ratio of the bounding box=$a_1/a_2$.

While a perfect sphere would possess an axis ratio of the bounding box of 1.0, all deviations from perfect sphericity lead to an axis ratio>1.0.

To determine form factor and axis ratio of samples, both properties are first determined for at least 50 individual particles of each sample and then averaged. The form factor of the individual particles is calculated from the perimeter and area determined from top view SEM images: Form factor=$(4\pi \cdot \text{area})/(\text{perimeter})^2$. While a perfect sphere would possess a form factor of 1.0, any deviation from perfect sphericity leads to form factors below 1.0.

In one embodiment of the present invention, said particulate (oxy)hydroxides and oxides of TM are comprised of secondary particles that are composed of primary particles. Preferably, said precursor is comprised of spherical secondary particles that are agglomerates of primary particles. Even more preferably, said precursor is comprised of spherical secondary particles that are agglomerates of plate-shaped, rod-shaped or needle-shaped primary particles or platelets.

In one embodiment of the present invention, said particulate (oxy)hydroxide or oxide of TM comprises a certain amount, for example 0.1 to 10 mol-% referring to TM, of metal in the oxidation state zero, for example nickel, said metal being a constituent of TM. Said metal in the oxidation state of zero and especially nickel is incorporated in the form of small particles of a maximum size of the particulate (oxy)hydroxide itself.

In one embodiment of the present invention, said particulate (oxy)hydroxides and oxides of TM may have a particle diameter distribution span in the range of from 0.5 to 0.9, the span being defined as [(D90)–(D10)] divided by (D50), all being determined by LASER analysis. In another embodiment of the present invention, said precursor may have a particle diameter distribution span in the range of from 1 to 4.

In one embodiment of the present invention the specific surface (BET) of said precursor is in the range of from 2 to 15 m²/g or even 15 to 100 m²/g, determined by nitrogen adsorption, for example in accordance with to DIN-ISO 9277:2003-05.

The inventive process is carried out in an apparatus that comprises a reaction vessel, for example a tank reactor, especially a stirred tank reactor. Said reactor comprises a gas inlet and a pipe connected with a device for solid-liquid separation.

In one embodiment of the present invention, the inventive process is carried out in an apparatus that comprises a tank reactor and a pipe connected with a device for solid-liquid separation, and another pipe for transferring the liquid phase resulting from the solid-liquid-separation to the tank reactor, in whole or in part.

In step (a), an aqueous slurry of metallic nickel and at least one metal selected from cobalt and manganese and aluminum is combined with an oxidant selected from nitrate and peroxide in a reaction vessel under an atmosphere with less than 100 ppm $O_2$, thereby obtaining an aqueous reaction medium with a pH value in the range of from 7.5 to 12. Said aqueous medium contains particles of freshly formed hydroxide of TM.

Preferably, such transition metals other than nickel are selected from cobalt and manganese and combinations of cobalt and manganese.

The metallic nickel may be in the form of powder, sheets, turnings, briquettes, pellets, rounds, lumps, and electrode fragments. Powders may have an average particle diameter in the range of from 0.01 to 1 mm. Sheets may have a thickness in the range of from 0.1 to 5 mm and a length and breadth that may be identical or different, each in the range of from 2 cm to 10 meters, in particular from 2 to 10 cm. Turnings for the purposes of the present invention may have a thickness of from 0.1 to 1 mm, a width 1 mm to 5 mm and a length of from 1 cm to 20 cm. Lumps may have a diameter in the range of from 1 mm to 5 cm but with an irregular shape. Electrode fragments may have a thickness in the range of from 0.5 to 7 mm and an average diameter from 10 to 40 mm.

Rounds may have a diameter of 2 to 3 cm and a height of approximately 0.8 to 1.5 cm; briquettes with dimensions of: length from 2 to 5 cm, breadth from 1 to 4 cm, height from 1 to 3 cm, and length bigger than height. For the purposes of the present invention, pellets have a diameter from 1 to 2 cm.

Aluminum and transition metals other than nickel may be in the form of powders, sheets, turnings, or lumps, with dimensions as defined above in the context of nickel.

The molar ratio of nickel to aluminum or transition metal, as the case may be, preferably corresponds to the stoichiometry of the desired product. In other embodiments, metals more noble than nickel are employed in a molar excess.

In one embodiment of step (a), the weight ratio of water to nickel and metals of TM other than nickel is in the range of from 20:1 to 0.1:1, preferably 10:1 to 0.5:1.

In step (a), an oxidant selected from nitrate and peroxide is present. Preferred nitrates are alkali metal nitrates such as sodium nitrate and potassium nitrate and combinations thereof. Although organic water-soluble peroxides are possible, a preferred hydroxide is $H_2O_2$.

In embodiments wherein a water-soluble peroxide is used stoichiometric amounts with respect to TM are applied.

Step (a) is performed under an atmosphere with less than 100 ppm $O_2$, preferably less than 20 ppm, more preferably 1 to 10 ppm, determined by gas chromatography or thermal conductivity detection (TCD). The unit ppm refers to parts per million in volume. A suitable atmosphere is, e.g., nitrogen or a noble gas such as argon. The atmosphere may be established by bubbling a flow of an inert gas selected from nitrogen and a rare gas through the aqueous reaction medium. Said flow may be constant or variable in the course of time, and said inert gas may contain at least one of $H_2O$ and $NH_3$. "Inert" in this context means inert towards oxidation of TM.

In one embodiment of the present invention, the temperature during step (a) is in the range of from 5 to 95° C., preferably 30 to 70° C.

In one embodiment of the present invention, step (a) is performed at an essentially constant temperature, that means that the temperature varies by up to 5° C., preferably up to 3° C.

In one embodiment of the present invention, step (a) is performed at a pressure in the range of from 0.5 bar (abs.) to 10 bar (abs.), preferably—for simplicity reasons—at ambient pressure or at a pressure that is slightly higher than ambient pressure, for example 1 to 20 mbar higher than ambient pressure.

In one embodiment of the present invention, wherein step (a) is performed in the presence of a complexing agent selected from ammonia, borate, polyborate, glycine, tartrate, citrate, and oxalate. In a particular embodiment of the present invention, step (a) is performed in the presence of ammonia and a complexing agent selected from borate, polyborate, glycine, tartrate, citrate, and oxalate. In such embodiments, such complexing agent other than ammonia is present in the range of from 0.1 to 10 mol/mol nickel.

It is preferred to perform the inventive process in the presence of ammonia. Ammonia may be used as complexing agent and for pH adjustment. In addition, when nitrate is used as oxidant, ammonia is formed during step (a).

In step (a), the pH value in the range of from 7.5 to 12, preferably 7.5 to 9.

In one embodiment of the present invention, at least one compound of manganese or aluminum is added in step (a). Examples of compounds of manganese are $MnSO_4$ or $MnCl_2$ or preferably manganese(II) acetate or even more preferably $Mn(NO_3)_2$, water of hydratization being neglected. Examples of compounds of aluminum are $Al_2(SO_4)_3$, $KAl(SO_4)_2$, $Al(NO_3)_3$, and $NaAl(OH)_4$.

By performing step (a), an aqueous reaction medium is obtained that contains solid particles. Said aqueous reaction medium is thus in the form of a slurry. The solid particles comprise hydroxide of TM. Said hydroxide of TM may comprise unreacted metallic nickel and other constituents of TM. However and in particular, said aqueous reaction medium is free from precipitated manganese dioxide particles.

By performing step (a), a simultaneous oxidation and precipitation is performed.

In one embodiment of the present invention, particles of an (oxy)hydroxide of TM are introduced in step (a) as seed particles. The composition of the seed particles may be different from the composition of the targeted precursor or the same, the same being preferred.

In one embodiment of the present invention, $Co(OH)_2$ or $Ni(OH)_2$ is used as seed particles regardless of the composition of the targeted precursor.

In one embodiment of the present invention, the average particle diameter (d50) of seed particles is in the range of from 3 to 15 μm but in any case lower than the targeted diameter of the precursor, preferably 5 to 12 μm, more preferably 8 to 10 μm. The average particle diameter of the seeds may be determined, e.g., by light scattering.

In one embodiment of the present invention, the weight ratio of seed particles to metal in the oxidation state of zero is in the range of from 3:2 to 1:10, preferably 4:3 to 1:2.

Especially in embodiments wherein a comparatively high share of seed particles is used, it is preferred to mill down some of the resultant precursor and to use the milled down fraction as seed particles in a new batch, or to remove a smaller particle fraction of the precursor by sieving and to use those smaller particles as seed particles.

In one embodiment of the present invention, seed particles are generated in situ by, e.g., introducing extra shear forces into the suspension by, e.g., strong stirring. By such strong stirring, existing particles may be divided into fragments, and additional seed particles may be generated by abrasion as well.

In one embodiment of the present invention, unreacted metal particles are removed from the aqueous slurry of step (a) by filtration or sedimentation or magnetic separation and returned to the reaction vessel. Magnetic separation will work for ferromagnetic metals such as cobalt and nickel.

In one embodiment of the present invention, neither in step (a) nor in step (b) any alkali metal hydroxide addition is required.

Step (b) includes removing the particles from step (a) from the liquid by a solid-liquid separation method and drying the particles so obtained. In particular, step (b) includes withdrawing slurry formed in step (b) and subjecting said slurry to a solid-liquid separation, for example decantation or centrifuge or filtration, filtration being preferred. Preferred embodiments of solid-liquid separation are filter presses and belt filters.

In a preferred embodiment of step (b), as solid phase, a filter cake is formed. As liquid phase, filtrate is obtained.

In one embodiment of the present invention, purification steps may be performed on the filter cake, for example rinsing with water or with aqueous ammonia, aqueous alkali metal solution or aqueous alkali carbonate solution. Magnetic separation steps may be performed as well, before or after drying, to remove unreacted nickel or cobalt or other ferromagnetic impurities like iron.

In preferred embodiments, the precursor is dried, for example under air at a temperature in the range of from 80 to 140° C. In other preferred embodiments, the precursor is dried, for example under air at a temperature in the range of from 80 to 140° C. and then under air at a temperature in the range of from 150 to 600° C.

In the course of step (b, the hydroxide of TM may be dried in one or several sub-steps, for example in at least two sub-steps at different temperatures, for example 80 to 150° C. in sub-step 1 and 165 to 600° C. in sub-step 2. Preferably, the residual moisture content of (oxy)hydroxides of TM is 5% by weight or below, for example 0.01 to 0.2% by weight. In the context of the present invention, the moisture content is calculated as g $H_2O$ per 100 g of (oxy)hydroxide of TM. In this case, $H_2O$ may be bound chemically as hydroxyl group, or be bound by physisorption. It is preferred that the residual moisture in (oxy)hydroxide or oxide of TM is low, for example 0.1 to 5% by weight. In the context of the present invention, a precursor is called an oxide if the residual moisture bound chemically as hydroxyl group is below 200 ppm by weight, determined by measuring the loss on ignition ("LOI"), that is the weight loss upon heating to, e.g., 500° C. In embodiments where the drying temperature is 600° C. for a considerable time, for example 4 to 12 hours, oxides of TM are obtained.

In one embodiment of the present invention, sub-step 1 is preferably performed in a spray dryer, in a fluidized-bed dryer, in a spin-flash dryer or in a contact dryer such as a paddle-dryer or pandryer. Sub-step 2 may be performed in a rotary kiln, a roller heath kiln or in a box kiln.

Said drying is performed in the presence of air, and this may lead to a partial oxidation. Especially manganese—if present—is partially oxidized to an oxidation stage of (+μl) or even (+IV).

In one embodiment of the present invention, the duration of the drying is in the range of from 30 minutes to 24 hours.

Step (c) includes returning liquid phase obtained in step (b) to the reaction vessel from step (a), in whole or in part. In one embodiment of the present invention, 80 to 99 vol.-% of the liquid is returned to the said reaction vessel.

By performing the inventive process, precursors of an excellent morphology may be obtained, and the generation of by-products such as solution of $Na_2SO_4$ is extremely low. When combined with a source of lithium, for example LiOH or $Li_2CO_3$, and thermally treated at 600 to 1,000° C. in e.g., a rotary kiln or a roller hearth kiln, cathode active materials with good properties and morphology are obtained.

Another aspect of the present invention is related to particulate (oxy)hydroxides and oxides, hereinafter also referred to as inventive precursors. Inventive precursors are particulate (oxy)hydroxides or oxides of TM, wherein TM comprises nickel and at least one metal selected from cobalt and manganese and aluminum, and wherein inventive precursors further comprise at least one metal of TM in the oxidation state of zero, for example 0.1 to 10 mol-% referring to TM.

In one embodiment of the present invention, in XRD spectra of inventive precursors, the intensity of the reflex at the angle of $2\theta=20.11\pm0.5°$ divided by the intensity of the peaks at angle $2\theta=8.86\pm0.5°$ and $2\theta=15.08\pm0.5°$ from $MoK\alpha1$ X-Ray diffraction is in the range from 0.01 to 0.25.

In one embodiment of the present invention, inventive precursors are selected from hydroxides and oxyhydroxides of TM wherein TM is a combination of metals according to general formula (I)

$$(Ni_aCo_bMn_c)_{1-d}M_d \qquad (I)$$

with a being in the range of from 0.6 to 0.95, preferably 0.80 to 0.94, b being in the range of from zero to 0.2, preferably 0.01 to 0.12, c being in the range of from zero to 0.2, preferably 0.02 to 0.10, d being in the range of from zero to 0.1, M is selected from Mg, Al, Ti, Zr, Mo, W, Al, Mg, Nb, and Ta, and combinations of at least two of the foregoing, preferably, M is selected from Mg and Al.

$$a + b + c = 1, \text{ and } c + d > \text{zero}.$$

For example, the variables in formula (I) may be defined as follows:

a is in the range of from 0.6 to 0.95, preferably 0.80 to 0.94, b is in the range of from 0.025 to 0.2, preferably 0.01 to 0.12, c is in the range of from zero to 0.2, and d is in the range of from zero to 0.1, preferably 0.02 to 0.10, M is selected from Mg, Al, Ti, Zr, Mo, W, Al, Mg, Nb, and Ta, $$a + b + c = 1, \text{ and } b + c > \text{zero}.$$

In another embodiment, TM corresponds to formula (I a)

$$(Ni_aMn_c)_{1-d}M_d \qquad (I a)$$

wherein a is in the range of from 0.6 to 0.95, preferably 0.80 to 0.94, c is in the range of from bigger than zero to 0.2, and d is in the range of from zero to 0.1, M is selected from Mg, Al, Ti, Zr, Mo, W, Al, Mg, Nb, and Ta, $$a + c = 1, \text{ and } c > \text{zero}.$$

Inventive precursors may contain traces of further metal ions, for example traces of ubiquitous metals such as sodium, calcium, iron or zinc, as impurities but such traces will not be taken into account in the description of the present invention. Traces in this context will mean amounts of 0.05 mol-% or less, referring to the total metal content of TM.

Particulate (oxy)hydroxide of TM is in particulate form. In one embodiment of the present invention, the mean particle diameter (D50) of inventive precursors is in the range of from 2 to 20 μm, preferably 3 to 16 μm, more preferably 7 to 14 μm. The mean particle diameter (D50) in the context of the present invention refers to the median of the volume-based particle diameter, as can be determined, for example, by light scattering. In one embodiment, inventive precursors have a monomodal particle diameter distribution. In other embodiments, the particle distribution of inventive precursors may be bimodal, for example with one maximum in the range of from 0.5 to 5 µm and a further maximum in the range of from 7 to 16 µm. Monomodal is preferred.

In another embodiment of the present invention the mean particle diameter (D50) of inventive precursors is in the range of from 1 to 7 µm, preferably 2 to 6 µm, more preferably 3 to 5 µm.

The particle shape of the secondary particles of inventive precursors is preferably spheroidal, that are particles that have a spherical shape. Spheroidal shall include not just those which are exactly spherical but also those particles with a form factor in the range of from 0.7 to 1 and an axis ratio of the bounding box in the range of from 1.00 to 1.25. To determine the axis ratio of the bounding box of a specific particle, the smallest possible, rectangular bounding box is set around the top view SEM image of a particle. The axis ratio is calculated from the length of the two sides $a_1$ and $a_2$ (with $a_1 \geq a_2$) by: axis ratio of the bounding box=$a_1/a_2$.

While a perfect sphere would possess an axis ratio of the bounding box of 1.0, all deviations from perfect sphericity lead to an axis ratio>1.0.

To determine form factor and axis ratio of samples, both properties are first determined for at least 50 individual particles of each sample and then averaged. The form factor of the individual particles is calculated from the perimeter and area determined from top view SEM images: Form factor=$(4\pi\text{-area})/(\text{perimeter})^2$. While, a perfect sphere would possess a form factor of 1.0, any deviation from perfect sphericity lead to form factors<1.0.

In one embodiment of the present invention, inventive precursors are comprised of secondary particles that are compose of primary particles. Preferably, said precursor is comprised of spherical secondary particles that are agglomerates of primary particles. Even more preferably, inventive precursor is comprised of spherical secondary particles that are agglomerates of plate-shaped, rod-shaped or needle-shaped primary particles or platelets.

Inventive precursors comprise a certain amount, for example 0.1 to 10 mol-% referring to TM, of metal in the oxidation state zero, for example nickel, said metal being a constituent of TM. Said metal in the oxidation state of zero and especially nickel is incorporated in the form of small particles of a maximum size of the particulate (oxy)hydroxide itself.

In one embodiment of the present invention, inventive precursors may have a particle diameter distribution span in the range of from 0.5 to 0.9, the span being defined as [(D90)–(D10)] divided by (D50), all being determined by LASER analysis. In another embodiment of the present invention, said precursor may have a particle diameter distribution span in the range of from 1.1 to 1.8.

In one embodiment of the present invention the specific surface (BET) of inventive precursors is in the range of from 2 to 10 m²/g or even 15 to 100 m²/g, determined by nitrogen adsorption, for example in accordance with to DIN-ISO 9277:2003-05.

Inventive precursors are advantageously obtained according to the inventive process.

Inventive precursors are advantageous starting materials for the manufacture of cathode active materials. For example, inventive precursor is mixed with a lithium compound, for example $Li_2CO_3$, LiOH or $Li_2O$, and calcined at high temperatures, for example at 600 to 1100° C.

The invention is further illustrated by working examples.

General: RP: Revolutions Per Minute

I. PRECURSOR MANUFACTURE

Example 1: Manufacture of a Precursor with Nickel/Cobalt Hydroxide Core-Shell Structure Step (a.1): A 1.6 L reaction vessel equipped with heating mantle with a temperature controller, with a three-blade impeller and a baffle was purged with argon and then charged with 600 mL de-ionized water. Ammonium nitrate (48 g) and 25.5 g sodium nitrate were transferred into the vessel. 75 g $Ni(OH)_2$ seeds, commercially available from Sigma Aldrich, average particle diameter (D50) 10.6 µm, were added to the mixture. The resulting suspension was agitated at a stir speed of about 600 rpm. It was observed that some of the seed particles were destroyed by stirring. The suspension was continuously purged with an Ar flow of 3 nl/h. The reaction mixture was heated to 60° C. 67.0 g of 25 wt. % aqueous ammonia was added to adjust pH to 9. An amount of 67.5 g cobalt powder with an average diameter (D50) of 9.19 µm were added in one portion. Throughout the reaction, the pH was continuously kept at pH 9 by addition of 65% nitric acid. After 2.5 hours the cobalt powder was dissolved and the reaction was complete.

Step (b.1): The resultant hydroxide of nickel and cobalt, P-CAM.1, was removed by filtration. It had an average particle diameter (D50) of 9.2 µm. It is excellently suited as precursor for a cathode active material.

Step (c.1): The filtrate from step (b.1) was re-used for a repetition of step (a.1).

Example 2: Manufacture of a Nickel Hydroxide

Step (a.2): A 1.6 L reaction vessel equipped with heating mantle with a temperature controller, with a three-blade impeller and a baffle was purged with nitrogen and then charged with 600 mL de-ionized water. 48 g Ammonium nitrate and 25.5 g sodium nitrate were transferred into the vessel. 75 g $Ni(OH)_2$ seeds, commercially available from Sigma Aldrich, average particle diameter 10.6 µm, were added to the mixture. The suspension was agitated at a stir speed of about 600 rpm. It was observed that some of the seed particles were destroyed by stirring. The suspension was continuously purged with an $N_2$ flow of 3 nl/h. The reaction mixture was heated to 60° C. 66.0 g of 25 wt. % aqueous ammonia was added to adjust pH to 9.67 g nickel powder (11.1 µm) were added in one portion. Throughout the reaction, the pH was continuously kept at pH 9 by addition of 65% nitric acid. After 21 hours the nickel powder was dissolved and the reaction was complete.

Step (b.2): The resultant hydroxide of nickel, P-CAM.2, was removed by filtration. It had an average particle diameter (D50) of 1.86 µm. It is excellently suited as precursor for a cathode active material.

Step (c.2): The filtrate from step (b.2) was re-used for a repetition of step (a.2).

Example 3: Manufacture of a Mixed Nickel/Cobalt Hydroxide

Step (a.3): A 1.6 L reaction vessel equipped with heating mantle with a temperature controller, a three-blade impeller and a baffle is purged with argon and then charged with 600 mL de-ionized water. Ammonium nitrate (48 g) and 25.5 g sodium nitrate are transferred into the vessel. 75 g $Ni(OH)_2$ seeds, commercially available from Sigma Aldrich, average particle diameter 10.6 µm, are added to the mixture. The suspension is agitated at a stir speed of about 600 rpm. Some of the seed particles are destroyed by stirring. The suspension is continuously purged with an Ar flow of 3 nl/h. The reaction mixture is heated to 60° C. 70.0 g of 25 wt. % aqueous ammonia is added to adjust pH to 8.5. Then, 60.75 g nickel powder and 6.75 g cobalt powder are added in one portion. Throughout the reaction, the pH is continuously kept at pH 8.5 by addition of 65% nitric acid. After 84 hours the nickel and cobalt powders are dissolved to a large extent and the reaction was complete.

Step (b.3): The resultant hydroxide of nickel and cobalt, P-CAM.3, is removed by filtration. It is excellently suited as precursor for a cathode active material.

Step (c.3): The filtrate from step (b.3) will be re-used for a repetition of step (a.3).

Comparative Precursor Manufacture:

A spherical $Ni(OH)_2$ precursor was obtained by combining aqueous nickel sulfate solution (1.65 mol/kg solution) with an aqueous 25 wt. % NaOH solution and using ammonia as complexation agent. The pH value was set at 12.6. The freshly precipitated $Ni(OH)_2$ was washed with water, sieved and dried at 120° C. for 12 hours. The resultant $Ni(OH)_2$ ("C-P-CAM.4") had an average particle diameter D50 of 10 µm.

II. MANUFACTURE OF CATHODE ACTIVE MATERIALS

General Protocol:

An amount of 50 g of the respective precursor, e.g., P-CAM.1, was mixed with $LiOH \cdot H_2O$ in a molar ratio Li/TM 1.01:1. The resultant mixture was poured into an alumina crucible and heated to 600° C. for one hour and then to 700° C. for 6 hours under oxygen atmosphere (10 exchanges/hour) with a heating rate of 3° C. min-. Said heat treatment was performed in laboratory furnace (Linn High Therm). A cathode active material was obtained, in the case of P-CAM.1 was obtained it is CAM.1-CAM.1 was cooled to 120° C. naturally and transferred into a dry room for further processing.

III. TESTING OF CATHODE ACTIVE MATERIALS

III.1 Cathode Manufacture, General Protocol:

Electrode manufacture: Electrodes contained 94% of the respective CAM or C-CAM.1, 3% carbon black (Super C65) and 3% binder (polyvinylidene fluoride, Solef 5130). Slurries with a total solids content of 61% were mixed in N-methyl-2-pyrrolidone (planetary mixer, 24 minutes, 2,000 rpm) and cast onto aluminum foil tape by a box-type coater. After drying of the electrode tapes for 16 h at 120° C. in vacuo and calendaring, circular electrodes with a diameter of 14 mm were punched, weighed and dried at 120° C. under vacuum for 12 hours before entering in an Ar filled glove box. Average loading: 8 mg/cm², electrode density: 3 g/cm³.

III.2 Coin Cell Manufacture

Coin-type electrochemical cells were assembled in an argon-filled glovebox. Anode: 0.58 mm thick Li foil, separated from the cathode by a glass fiber separator (Whatman GF/D). An amount of 95 µl of 1 M $LiPF_6$ in ethylene carbonate (EC): dimethyl carbonate (DMC), 1:1 by weight, was used as the electrolyte. After assembly, the cells were crimped closed in an automated crimper.

The cells were then transferred to a climate chamber and connected to a battery cycler (Series4000, MACCOR).

III.3 Coin Cell Testing.

All tests were performed at 25° C. Cells were galvanostatically cycled at a Maccor 4000 battery cycler between 3.1 and 4.3 V at room temperature by applying the following C-rates until 70% of the initial discharge capacity is reached at a certain discharge step:

The test protocol consisted of an initial formation and rate test part, starting with two cycles at C/20. For all cycles, the voltage window was set to 2.7-4.3 V and a rest time of 5 min after charge and discharge was integrated. As an initial 1 C rate, 200 mA g$^{-1}$ were assumed. For all subsequent cycles, the charge was set to CCCV at C/10 and 4.3 V for 30 min or until the current drops below C/50. The cells were discharged at C/10 until 3V. One cycle at C/3 for charge and discharge was applied before stepwise increasing the discharge rate (C/10, 1C, 2 C) and lowering the cutoff to 2.7 V. After this initial period, the cells were cycled for 50 cycles at C/3 charge and discharge.

TABLE 1

CAM properties and Capacities from Coin Half Cell testing

| P-CAM | CAM | residual $Li_2CO_3$ [wt.-%] | 1st cycle charge/mAh g$^{-1}$ 0.1 C | 1st cycle discharge/mAh g$^{-1}$ 0.1 C |
|---|---|---|---|---|
| P-CAM.1 | CAM.1 | 0.33 | 268.3 | 235.4 |
| P-CAM.2 | CAM.2 | 0.36 | 257.7 | 238.5 |
| P-CAM.3 | CAM.3 | | | |
| C-P-CAM.4 | C-CAM.4 | 0.40 | 255.7 | 226.5 |

The residual $Li_2CO_3$ was determined by extraction with water, followed by titration with 0.2 M HCl to a pH value of 4.5.

It is observed that cathode active materials made from inventive precursors show a good electrochemical performance and have a remarkable low content of residual lithium carbonate.

The invention claimed is:

1. A process for making a particulate (oxy)hydroxide or oxide of TM, wherein TM represents one or more metals, and wherein TM comprises nickel or cobalt and, optionally, at least one metal selected from the group consisting of aluminum and manganese, wherein said process comprises the steps of:

(a) combining an aqueous slurry of metallic nickel or cobalt and, optionally, at least one metal selected from the group consisting of manganese and aluminum with an oxidant selected from the group consisting of nitrate and peroxide in a reaction vessel under an atmosphere with less than 100 ppm $O_2$, thereby obtaining an aqueous reaction medium with a pH value in a range of from 7.5 to 12 containing particles;

(b) removing the particles from step (a) from a liquid in step (a) by a solid-liquid separation method, and drying the particles to obtain the particulate (oxy)hydroxide or oxide of TM; and (c) returning mother liquor obtained in step (b) to the reaction vessel.

2. The process according to claim 1, wherein the particulate (oxy)hydroxide or oxide is selected from the group consisting of hydroxides and oxyhydroxides of TM, wherein TM is a combination of metals according to general formula (I)

$$(Ni_aCo_bMn_c)_{1-d}M_d \qquad (I)$$

with
a being in a range of from 0.6 to 0.95,
b being in a range of from 0.025 to 0.2,
c being in a range of from zero to 0.2, and
d being in a range of from zero to 0.1,
M is selected from the group consisting of Mg, Al, Ti, Zr, Mo, W, Al, Nb, and Ta, and $$a + b + c = 1, \text{ and } b + c > \text{zero.}$$

3. The process according to claim 1, wherein the particulate (oxy)hydroxide or oxide is selected from the group consisting of hydroxides and oxyhydroxides of TM, wherein TM is a combination of metals according to general formula (I a)

$$(Ni_aMn_c)_{1-d}M_d \qquad (I\ a)$$

with
a being in a range of from 0.6 to 0.95,
c being in a range of from bigger than zero to 0.2, and

d being in a range of from zero to 0.1,
M is selected from the group consisting of Mg, Al, Ti, Zr, Mo, W, Al, Nb, and Ta, and $$a + c = 1, \text{ and } c > \text{zero.}$$

4. The process according to claim 1, wherein in step (a), a complexing agent selected from the group consisting of ammonia, borate, polyborate, glycine, tartrate, citrate, and oxalate is present.

5. The process according to claim 2, wherein c+d>zero.

6. The process according to claim 1, wherein metallic particles are removed from the aqueous reaction medium of step (a) by filtration, sedimentation, or magnetic separation and returned to the reaction vessel.

7. The process according to claim 1, wherein in step (a), a salt of manganese is added.

8. The process according to claim 1, wherein a temperature during step (a) is in a range of from 5 to 95° C.

9. The process according to claim 1, wherein in step (a) no alkali metal hydroxide is added.

10. The process according to claim 1, wherein in step (a), a flow of an inert gas selected from the group consisting of nitrogen and a rare gas is bubbled through the aqueous reaction medium.

11. The process according to claim 10, wherein the flow of the inert gas contains at least one of $H_2O$ and $NH_3$.

12. The process according to claim 1, wherein particles of (oxy)hydroxide of TM are introduced in step (a) as seed particles.

* * * * *